UNITED STATES PATENT OFFICE 2,661,162

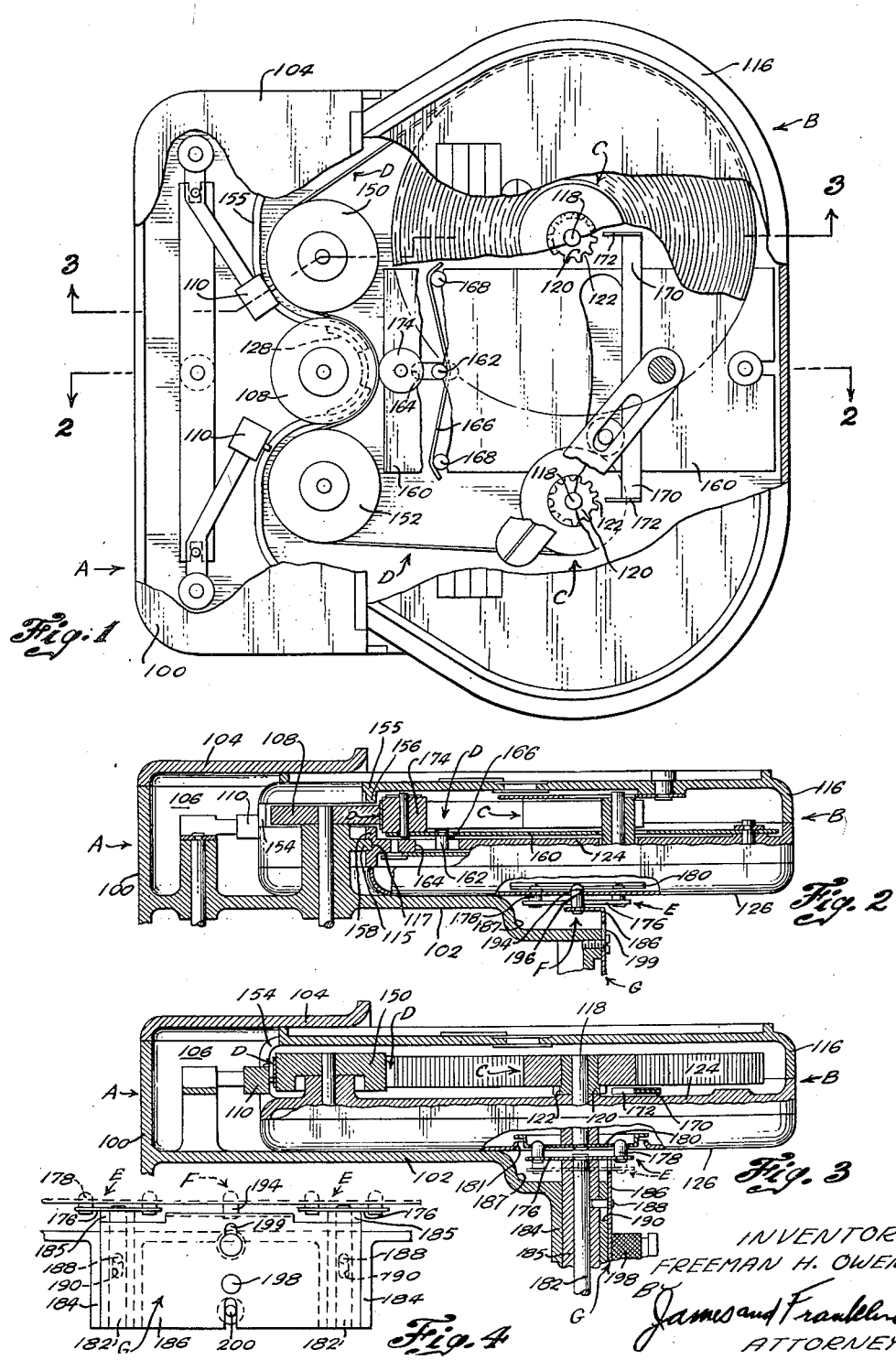

DRIVING AND LOCKING MEANS FOR APPARATUS HAVING REMOVABLE MAGAZINE

Freeman H. Owens, New York, N. Y.

Application May 13, 1948, Serial No. 26,736

10 Claims. (Cl. 242—55)

This invention relates to an apparatus having a magazine which may be removably secured thereto, and more particularly relates to the construction and mounting of the driving and locking means on said apparatus adapted to cooperate with said magazine.

Many types of apparatus employ magazines, among which may be mentioned motion picture cameras and projectors, magnetic tape or wire recording and reproducing units, photographic sound track recording and reproducing apparatus and the like. It is characteristic of all of these that the magazine contains an element, usually in the form of a spool, adapted to be driven by mechanism including a motor and connections between said motor and the spool for driving the latter, said mechanism being a part of the apparatus itself. The driving connection between the motor and the spool must be breakable so that the magazine may be removed.

Various mechanical arrangements for accomplishing this result have in the past been employed with differing degrees of success. Two of the most pressing problems involved are to attain a positive driving connection for rotation of the spool and to ensure that said driving connection is not made until rotation of the spool is proper, that is to say, until the magazine is in proper position on the apparatus. If the spool and the magazine be rotated before the magazine is in position on the apparatus, translation of the reproducing medium, be it wire, tape or film, would be effected before said medium is in proper relation to the reproducing mechanism. Consequently, whatever intelligence may have been recorded on the medium would not be reproduced. In addition, magazines are sometimes provided with mechanism for preventing undesired rotation of the spools while the magazine is not on the apparatus. Any attempt to rotate the spools by drivingly connecting them with the motor in the apparatus before such rotation-restraining mechanism is released would result in damage either to the magazine, the driving mechanism, or the rotation-inhibiting mechanism.

It is also essential, in apparatus of this type, that means be provided for fixing or locking the magazine in proper position on the apparatus. If the locking mechanism be operable independently of the driving mechanism, it is entirely possible that, if the locking mechanism is inadvertently withdrawn while the driving mechanism is still engaged, any attempt to rotate the spools via the motor or any force applied to the magazine would be likely to result in damage to the driving mechanism, which is normally not designed both to rotate the spool and to withstand the strains which result from the tendency of the magazine to move away from its proper position on the apparatus.

It is the prime object of the present invention to devise a driving and locking means for apparatus of the type described in which engagement between the driving means and the driven element can be made only when the magazine is locked in proper position on the apparatus.

It is another object of the present invention to devise such an apparatus in which the driving means engageable with the spools in the magazine and the locking means engageable with the magazine itself to fix it in proper position on the apparatus are both simultaneously operable so that driving engagement between the driving means and the spools is automatically made when the magazine is locked in position and said driving engagement is automatically broken as soon as the magazine is no longer locked in position, thus eliminating any possibility of straining or damaging the driving connections by subjecting them to stresses and strains which they are not designed to withstand.

A further object of the present invention is to devise such an apparatus in which the magazine is adapted to be slid into proper position on the apparatus and in which the driving means is mounted on the apparatus so as to be movable between a position in which it does not interfere with the sliding movement of the magazine and a position in which driving engagement with the spools in the magazine is accomplished. Yet another object is to mount the locking pin in a substantially similar manner for substantially similar purposes.

A more specific object of the present invention is to construct the driving and locking means in an uncomplicated manner so that their operation is positive and reliable and so that their cost is minimal.

Yet another specific object of the present invention is to connect the driving and locking means to the actuator therefor in a rigid manner so that if the magazine is not in proper position on the apparatus, the driving means cannot be moved into engagement with the spool.

To the accomplishment of the foregoing objects and such other objects as may hereinafter appear, the present invention relates to a driving and locking means and to the construction thereof as defined in the appended claims and as described in this specification, taken together with the accompanying drawings, in which:

Fig. 1 is a top view of one embodiment of the present invention, the top wall of the magazine being broken away in part to disclose the interior thereof;

Fig. 2 is a view taken along the line 2—2 of Fig. 1;

Fig. 3 is a view taken along the line 3—3 of Fig. 1; and

Fig. 4 is a fragmentary view showing the mounting arrangement for the driving and locking means.

Viewed in its broad aspects, my invention relates to an apparatus generally designated A upon which a structure B, here shown in the form of a magazine, is adapted to be removably placeable, the magazine structure B containing an element C adapted to be driven, here shown in the form of a pair of spools upon which is wound and between which extends a reproducing medium D. The apparatus A includes a driving means E adapted, when the magazine B is in proper position on the apparatus A, to make engagement with and rotatably drive the spools C, and a locking means F adapted to engage the magazine B itself, when it has been moved to proper position on the apparatus A, so as to fix the magazine B in that position. An actuator generally designated G is operatively connected to the driving means E and the locking means F so as to move them between positions of engagement and non-engagement, the connection between the actuator G and the driving means E and the locking means F being of simple and rigid construction so that the driving means E and locking means F can only be moved simultaneously. By reason of this rigid connection, if the magazine B is not in proper position on the apparatus A, the locking means F will not be movable to a position of engagement and consequently the driving means E will similarly not be movable to a position of engagement.

The apparatus is here illustrated in the form of a magnetic tape recording and reproducing unit, but it will be understood that this is by way of exemplification only and that my invention is applicable to many other types of machines.

The magazine B and reproducing apparatus A are so constructed and related that the magazine B is adapted to be brought to proper position upon the apparatus A by sliding the same over the top of the apparatus, that is to say, in the plane of Fig. 1. To this end, the driving means E and locking means F are movable on the apparatus A between a semi-housed position in which they do not interfere with the sliding motion of the magazine B and a projecting position in which they are engageable respectively with the spools C in the magazine B.

The apparatus A comprises a framework 100, including a top wall 102 over which the magazine is adapted to be slid, and a cover 104 extends over at least a portion of the top plate 102 and defines a housing or recess 106 into which the front portion of the magazine B is adapted to be received and in which is housed a tape driving roller 108 and the magnetizing means 110 adapted to cooperate with the reproducing medium D so as to record thereon or reproduce therefrom. The apparatus A is provided with a stop lug 115 adapted to be received within a slot 117 in the magazine B for fixing their relative positions.

The magazine B comprises a casing 116 within which are housed the spools C, each being mounted upon a shaft 118 for rotation therewith. A disc 120 provided with a plurality of peripheral notches 122 is fixed to the shaft 118 below each of the spools C and the shaft 118 is journalled in the central casing member 124 which extends through the magazine B approximately intermediate its height. The magazine is also provided with a bottom wall 126 which is adapted to slide over the top wall 102 of the apparatus A. The mechanism contained between the central casing member 124 and the bottom wall 126 forms no part of the present invention, but is described with particularity in my copending application, Serial No. 26,735, filed May 13, 1948, now Patent No. 2,584,734, entitled "Control Mechanism."

The front portion of the magazine B narrows so as to be receivable within the housing 106 and the central portion thereof is cut back so as to define the indentation 128. A pair of rollers 150 and 152 are positioned to either side of the indentation 128 and the reproducing medium D is adapted to pass from one spool C over the roller 152, around the indentation 128, over the roller 150, and thence to the other spool. A slot or aperture 154 is formed in the front end wall 155 of the magazine B, said slot exposing the reproducing medium D as it passes over the rollers 150 and 152 so as to permit access thereto by the magnetizing means 110. In addition, the aperture at the center of the indentation 128 is defined between flanges 156 and 158 (see Fig. 2), the distance between the opposing faces of said flanges 156 and 158 being sufficient to permit entry therethrough of the drive wheel 108 but insufficient to permit egress therefrom of the reproducing medium D, the height of the reproducing medium D being greater than the opening between the flanges 156 and 158.

A plate 160 (see Figs. 1 and 2) is mounted on the central casing member 124 so as to be slidable parallel thereto, a pin 162 projecting downwardly from the plate 160 into slot 164 formed in said central casing member 124 so as to limit said sliding motion. A spring 166 is active upon the pin 162 so as to urge the same, and hence the plate 160, toward the front end wall 155 of the magazine, the ends of the spring 166 being retained by pins 168 secured to the central casing member 124.

The plate 160 is positioned between the spools C and preferably slightly below them and is provided with widely projecting arms 170 each having a finger 172 in line with the discs 120 and receivable within the peripheral notches 122 of said discs. When the spring 166 slides the plate 160 toward the aperture 154 in the front end wall 155 of the magazine B, the fingers 172 will engage in the peripheral slots 122 of the discs 120 and thus positively prevent rotation of the spools C. When the plate 160 is moved in the opposite direction, away from the apertured front end wall 155, the fingers 172 will be removed from the peripheral notches 122 and consequently the spools C will be free to rotate as desired.

A tension roller 174 (see Figs. 1 and 2) is rotatably mounted on the end of the plate 160 opposite the indentation 128 so as to project slightly therefrom toward the front end wall 155 of the magazine B and the reproducing medium D is adapted to pass thereover. It will be noted from Fig. 2 that the height of the tension roller 174 is comparable to that of the reproducing medium D so that the roller 174, like the reproducing medium D, cannot project out from the magazine B past the flanges 156 and 158. When the plate 160 is moved by the spring 166 toward the front end wall 155 of the magazine B, as will be the case when the magazine is not in position on the apparatus A, the roller 174 will press or clamp the reproducing medium D between itself and the flanges 156 and 158 at the same time that the fingers 172 engage in the peripheral notches 122 in the discs 120 attached to the spools C. Consequently, when the magazine is removed from the apparatus, not only will the spools C be locked against rotation, but the reproducing medium D itself will be clamped in position. However, when the magazine B is slid to its proper position on the apparatus A, the driving wheel 108 will enter between the flanges 156 and 158 (see Fig. 2) and will force the tension roller 174 and consequently the plate 160 in a direction away from the front end wall 155, thus simultaneously releasing the reproducing medium D from its clamped position between the tension roller 174 and the flanges 156 and 158 and releasing the fingers 172 from their engagement with the discs 120. The reproducing medium D will then be clamped in proper driving relationship between the driving wheel 108 and the tension roller 174 and the spools C will be rotatable so that reproduction may take place.

The driving means E (see Figs. 3 and 4) may take the form of discs 176 having pins 178 projecting upwardly therefrom and receivable in apertures in a second disc 180 fast on the spool shafts 118 in the magazine B and located within recesses 181 in the bottom wall 126 thereof. The discs 176 are rotatable with suitably driven shafts 182, the shafts 182 being vertically slidable inside fixed bushings 184 which form part of the apparatus A, the discs 176 moving therewith. Sleeves 185 within which the shafts 182 are rotatable may be interposed between the shafts 182 and the bushings 184 so as to be vertically movable with the shafts 182. A plate 186 constituting the actuator G is provided with a pair of pins 188 each slidable in a slot 190 in a bushing 184 and engageable with a sleeve 185 within which a shaft 182 is rotatable so as to bodily move the shafts 182, the sleeves 185 and the discs 176 vertically between a housed position shown in broken lines in Fig. 3, in which the driving means E are received within a recess 187 formed in the top wall 102 of the apparatus A so that the tips of the projections 178 are positioned below the top wall 102 of the apparatus A, thus permitting the magazine B to be slid into proper position, and a projecting position as shown in the solid lines in Fig. 3, in which the projections 178 are moved upwardly so as to be receivable within the apertures in disc 180 so as to drive the spools C in rotation.

Centrally mounted upon the same plate 186 is a centering and locking pin 194, constituting the locking means F, which is adapted, when the plate 186 is moved to its upward position, to be received within a suitable aperture 196 in the bottom wall 126 of the magazine B (see Fig. 2) so as to lock the latter in its proper position. When the plate 186 is in its lower position, the locking pin 194, like the driving means E, is received within the recess 187 so as not to interfere with motion of the magazine B. A fingerpiece 198 may be provided for manipulation of the plate 186 and pin and slot arrangements designated generally 199 and 200 may be provided for limiting and controlling the up and down motion of the plate 186 and for retaining it in position on the apparatus A.

The manner of functioning of the driving and locking means of the present invention will in the main be apparent from the preceding description. When the actuator G is moved downwardly, the driving means E and the locking means F move downwardly therewith to a position housed within the recess 187, in which position the centering and locking pin 194 and the tips of the projections 178 on the discs 176 are all positioned below the top wall 102 of the apparatus A over which the magazine B is adapted to slide, thus permitting the magazine B to be moved to and from its proper position on the apparatus A. Once the magazine B has been slid all the way forward, so that the stop lug 115 is received within the slot 117, the actuator G may be moved to its upward position, at which time the locking means F will engage with the magazine B, the centering and locking pin 194 passing into the aperture 196, thus locking the magazine B in proper position, and at the same time the driving means E will move upwardly so that the projections 178 on the discs 176 are received within the apertures in the discs 180 positioned at the bottom of the magazine B. Since the driving means E and locking means F are both rigidly connected to the actuator G, it will be apparent that any upward motion of the actuator G, if the magazine B is not in proper position, will be positively prevented, since the centering and locking pin 194 will not be in registration with the aperture 196, and hence the upward motion of the driving means will also be positively prevented. There is thus no possibility that engagement can be made between the driving means E and the spools C unless and until the magazine B is locked in its proper position. Moreover, if for any reason the locking means F should be withdrawn, by virtue of the same rigid connection between the driving means E, the locking means F and the actuator G, the driving means E will also simultaneously be withdrawn, thus preventing any possibility that lateral stresses or strains might be placed upon the driving means E. The arrangement which permits the achievement of these safety factors is extremely simple and compact, is devoid of complicated linkages, and is highly positive in operation. The connection between the plate 186, which directly carries the locking means F, and the driving means E by means of pin 188 received within the sleeve 185 and slidable within the slot 190 in the bushing 184 permits ready rotation of the driving shafts 182 and at the same time accomplishes in a simple and sturdy manner the vertical movement of such shafts.

While only one embodiment of the present invention has been here illustrated, it will be apparent that it is susceptible of many variations in detail within the spirit of the invention as defined in the appended claims.

I claim:

1. In an apparatus on which a magazine containing a spool to be driven is adapted to be removably placed, a wall over which said magazine is adapted to be slid to proper position on said apparatus, said wall having a recess, a bushing in said recess, a sleeve vertically movably mounted in said bushing, a driving shaft rotatably mounted in said sleeve and vertically movable therewith, a driving means for said spool connected to said shaft and vertically movable therewith between a housed position in which said driving means is received within said recess and does not interfere with sliding movement of said magazine along said wall and an operative position in which said driving means projects from said recess and makes driving engagement with said spool, a plate mounted for vertical movement on the exterior of said bushing, and a pin carried by said plate and engageable with said sleeve via a slot in said bushing so as to vertically move said sleeve, and hence said shaft and said driving means, as said plate is manipulated.

2. The apparatus of claim 1, in which said plate also carries a locking pin vertically movable with said plate between a position housed within said recess in which it does not interfere with the sliding movement of said magazine over said wall and an operative position in which it projects from said recess to engage with said magazine and lock it in proper position on said apparatus when said driving means makes driving engagement with said spool.

3. In combination, an apparatus and a magazine containing a spool to be driven, said apparatus comprising a side wall and a supporting wall, said supporting wall having a recess adjacent said side wall, said magazine being adapted to be slid over said supporting wall to and from proper position in said apparatus, a driving shaft rotatably and vertically movably mounted in said recess, a driving means for said spool connected to said shaft and vertically movable therewith between a housed position within said recess in which it does not interfere with sliding movement of said magazine over said supporting wall and an operative position in which it projects from said recess and makes driving engagement with said spool, and an actuator on the exterior of said apparatus and movable along said side wall between positions both of which are outside the space through which said magazine passes as the latter is slid to and from its proper position on said apparatus, said actuator being operatively connected to said shaft so as to vertically move said shaft as said actuator is manipulated.

4. In combination, an apparatus and a magazine containing a spool to be driven, said apparatus comprising a side wall and a supporting wall, said supporting wall having a recess adjacent said side wall, said magazine being adapted to be slid over said supporting wall to and from proper position in said apparatus, a driving shaft rotatably and vertically movably mounted in said recess, a driving means for said spool connected to said shaft and vertically movable therewith between a housed position within said recess in which it does not interfere with sliding movement of said magazine over said supporting wall and an operative position in which it projects from said recess and makes driving engagement with said spool, and a plate vertically slidable on said side wall between positions both of which are outside the space through which said magazine passes as the latter is slid to and from its proper position on said apparatus, said plate being operatively connected to said shaft so as to vertically move said shaft as said plate is slid.

5. In combination, an apparatus and a magazine containing a spool to be driven, said apparatus comprising a side wall and a supporting wall, said supporting wall having a recess adjacent said side wall, said magazine being adapted to be slid over said supporting wall to and from proper position in said apparatus, a driving shaft rotatably and vertically movably mounted in said recess, a driving means for said spool connected to said shaft and vertically movable therewith between a housed position within said recess in which it does not interfere with sliding movement of said magazine over said supporting wall and an operative position in which it projects from said recess and makes driving engagement with said spool, a locking element on said apparatus and engageable with said magazine for fixing the latter in proper position on said apparatus, said locking element being mounted on said apparatus so as to be movable between a housed position within said recess in which it does not interfere with sliding movement of said magazine over said supporting wall and an operative position in which it projects from said recess and makes locking engagement with said magazine, and an actuator on the exterior of said apparatus and movable along said side wall, said actuator being operatively connected to said shaft and to said locking element so as to simultaneously vertically move said shaft and said locking element as said actuator is manipulated.

6. In combination, an apparatus and a magazine containing a spool to be driven, said apparatus comprising a side wall and a supporting wall, said supporting wall having a recess adjacent said side wall, said magazine being adapted to be slid over said supporting wall to and from proper position in said apparatus, a driving shaft rotatably and vertically movably mounted in said recess, a driving means for said spool connected to said shaft and vertically movable therewith between a housed position within said recess in which it does not interfere with sliding movement of said magazine over said supporting wall and an operative position in which it projects from said recess and makes driving engagement with said spool, a locking element on said apparatus and engageable with said magazine for fixing the latter in proper position on said apparatus, said locking element being mounted on said apparatus so as to be movable between a housed position within said recess in which it does not interfere with sliding movement of said magazine over said supporting wall and an operative position in which it projects from said recess and makes locking engagement with said magazine, a plate vertically slidable on said side wall, said locking element being mounted directly on said plate, and an operative connection between said plate and said shaft so that said shaft and said locking element will simultaneously vertically move as said plate is slid.

7. In combination, an apparatus and a magazine containing a spool to be driven, said apparatus comprising a side wall and a supporting wall, said supporting wall having a recess adjacent said side wall, said magazine being adapted to be slid over said supporting wall to and from proper position on said apparatus, a bushing in said recess, a sleeve vertically movably mounted in said bushing, a driving shaft rotatably mounted in said sleeve and vertically movable therewith, a driving means for said spool connected to said shaft and vertically movable therewith between a housed position in which said driving means is received within said recess and does not interfere with sliding movement of said magazine along said supporting wall and an operative position in which said driving means projects from said recess and makes driving engagement with said spool, and an actuator on the exterior of said apparatus and movable along said side wall, said actuator being rigidly operatively connected to said sleeve through said bushing so as to vertically move said sleeve as said actuator is manipulated.

8. In combination, an apparatus and a magazine containing a spool to be driven, said apparatus comprising a side wall and a supporting wall, said supporting wall having a recess adjacent said side wall, said magazine being adapted to be slid over said supporting wall to and from proper position on said apparatus, a bushing in said recess, a sleeve vertically movably mounted in said bushing, a driving shaft rotatably mounted in said sleeve and vertically movable therewith, a driving means for said spool connected to said shaft and vertically movable therewith between a housed position in which said driving means is received within said recess and does not interfere with sliding movement of said magazine along said supporting wall and an operative position in which said driving means projects from said recess and makes driving engagement with said spool, a plate vertically slidable on said side wall, and a rigid operative connection between said plate and said sleeve through said bushing so as to vertically move said sleeve as said plate is slid.

9. In combination, an apparatus and a magazine containing a spool to be driven, said apparatus comprising a side wall and a supporting wall, said supporting wall having a recess adjacent said side wall, said magazine being adapted to be slid over said supporting wall to and from proper position on said apparatus, a bushing in said recess, a sleeve vertically movably mounted in said bushing, a driving shaft rotatably mounted in said sleeve and vertically movable therewith, a driving means for said spool connected to said shaft and vertically movable therewith between a housed position in which said driving means is received within said recess and does not interfere with sliding movement of said magazine along said supporting wall and an operative position in which said driving means projects from said recess and makes driving engagement with said spool, a locking element on said apparatus and engageable with said magazine for fixing the latter in proper position on said apparatus, said locking element being mounted on said apparatus so as to be movable between a housed position within said recess in which it does not interfere with sliding movement of said magazine over said supporting wall and an operative position in which it projects from said recess and makes locking engagement with said magazine, and an actuator on the exterior of said apparatus and movable along said side wall, said actuator being rigidly operatively connected to said sleeve through said bushing and being operatively connected to said locking element, so as to simultaneously vertically move said sleeve and said locking element as said actuator is manipulated.

10. In combination, an apparatus and a magazine containing a spool to be driven, said apparatus comprising a side wall and a supporting wall, said supporting wall having a recess adjacent said side wall, said magazine being adapted to be slid over said supporting wall to and from proper position on said apparatus, a bushing in said recess, a sleeve vertically movably mounted in said bushing, a driving shaft rotatably mounted in said sleeve and vertically movable therewith, a driving means for said spool connected to said shaft and vertically movable therewith between a housed position in which said driving means is received within said recess and does not interfere with sliding movement of said magazine along said supporting wall and an operative position in which said driving means projects from said recess and makes driving engagement with said spool, a locking element being mounted on said apparatus so as to be movable between a housed position within said recess in which it does not interfere with sliding movement of said magazine over said supporting wall and an operative position in which it projects from said recess and makes locking engagement with said magazine, and a plate vertically slidable on said side wall, said locking element being mounted directly on said plate, and a rigid operative connection between said plate and said sleeve via said bushing so as to simultaneously vertically move said sleeve and said bushing as said plate is slid.

FREEMAN H. OWENS.

References Cited in the file of this patent

UNITED STATES PATENTS

| Number | Name | Date |
| --- | --- | --- |
| 1,713,503 | Von Madaler | May 14, 1929 |
| 2,126,299 | Wittel et al. | Aug. 9, 1938 |
| 2,342,511 | Gaty | Feb. 22, 1944 |
| 2,422,143 | Somers et al. | June 10, 1947 |
| 2,466,124 | Owens | Apr. 5, 1949 |